3,579,369
WOOD MEMBERS IMPREGNATED WITH SYNTHETIC ORGANIC RESINS AND METHOD OF PRODUCING SUCH IMPREGNATED MEMBERS
Newton C. Foster, Pittsburgh, Pa., assignor to Westinghouse Electric Corporation, Pittsburgh, Pa.
No Drawing. Filed June 26, 1968, Ser. No. 740,098
Int. Cl. B44d 1/28; B27k 3/36
U.S. Cl. 117—57      9 Claims

ABSTRACT OF THE DISCLOSURE

A method of making a synthetic organic resin impregnated wood member wherein the wood is pretreated with an activator, such as dimethyl aniline, in the vapor phase. A synthetic organic liquid resinous composition containing, for example, styrene and an unsaturated polyester catalyzed with benzoyl peroxide is then impregnated into the wood at about room temperature causing the resin to polymerize within the wood.

BACKGROUND OF THE INVENTION

This invention relates to wood plastic composites and to methods for manufacturing them. More particularly, this invention relates to introducing and polymerizing various organic resins in wood, the polymerization occurring at about room temperature.

Combinations of wood and synthetic organic resin, such as polystyrene, unite the natural beauty of wood with the strength and durability of the plastic. Wood-plastic compositions are many times harder and more abrasion resistant than their untreated wood counterpart. They have much higher compression strength, bending strength and shear strength. They also absorb moisture much more slowly than natural wood. This results in an apparent greater dimensional stability for such wood-synthetic organic resin members.

The typical wood-plastic composite has good machineability characteristics, especially in the cross grain direction. It is easily fabricated with conventional woodworking equipment and can be bonded with many commercially available adhesives. Moreover, if the original finish is damaged, it can be restored quickly to original color and quality simply by sanding and buffing. This is because the finish is more than skin deep. It is an integral part of the material's inner structure.

On the debit side, wood-plastic composites because of cost of production are substantially more expensive than wood alone. For this reason, use of such composites is limited to areas where the raw material cost is a small part of the overall manufacturing cost or where the aesthetic qualities of wood are highly desirable and exceptional durability is required.

During the past several years much work has been done on polymerizing various monomers impregnated into the wood, with gamma radiation. The most practical resin monomer impregnant suggested for methods employing radiation cures is methyl methacrylate. Other monomers such as styrene, which costs one-half to one-third the price of methyl methacrylate, are not practical in these prior art methods because of the excessive amount of radiation required for polymerization of compositions containing styrene.

In the irradiation polymerization process of making these composites, the impregnated wood must be sealed in plastic bags to help prevent loss of monomers by evaporation before irradiation. In addition a $\frac{1}{32}$–$\frac{1}{16}$ inch surface layer of material must generally be removed after polymerization before a uniform wood-resin ratio is reached. Both of these steps would be particularly disadvantageous if veneer, veneer coated plywood, or chipboard or even thin sections of wood are to be coated.

SUMMARY OF THE INVENTION

Accordingly, it is the general object of this invention to provide a new and improved method of fabricating lower cost wood-plastic members utilizing a vapor phase activator pretreatment of the wood.

It is another object of this invention to provide new and improved wood-plastic members which do not require removal of surface layers before a uniform wood-resin ratio is reached.

Briefly, the foregoing objects are accomplished by polymerization of a resin within the wood at room temperature by utilizing a fluid volatile activator which is impregnated into the wood in the vapor phase before the addition of the catalyzed resin.

Such a process requires a vacuum pump, pressure gauge and fittings all common and inexpensive production articles. The radiation process would require completely new plant facilities and a sizeable investment for a cobalt radiation source. In addition the process of this invention can utilize resinous impregnating compositions containing less expensive monomers.

To date wood-synthetic organic resin composites have been successfully marketed as cutlery handles, cue sticks and parquet flooring. Wearability and durability of the new wood form, when coupled with the economies of the method of this invention could have wide impact in the manufacture of other sporting goods such as gunstocks, baseball bats and tennis rackets. Other uses which might now be competitively feasible would include brush handles, desk tops, high wear surfaces on office, hotel and school furnishings and wood veneers.

DESCRIPTION OF THE PREFERRED EMBODIMENTS

Suitable resins for use in impregnating wood blocks or boards in accordance with this invention contain liquid acrylic or vinyl monomers generally reacted with solid or liquid unsaturated reactive polyesters. More specific examples of suitable liquid monomers are methyl methacrylate, vinyl toluene, vinyl acetate and vinyl benzene (styrene). These monomers can be reacted with about 5–50% unsaturated reactive polyester. Reference may be made to the following pages in the 1968 Edition of Modern Plastics Encyclopedia, published by McGraw-Hill, Inc., and incorporated herein by reference, for a detailed description and discussion of: acrylics—page 125, and vinyls—page 277.

Styrene is the preferred monomer for use in this invention primarily because it is the cheapest. The initial step in the production of styrene is combining benzene and ethylene to produce ethyl benzene:

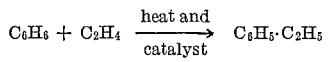

Purified ethyl benzene is then dehydrogenated catalytically in the presence of steam to produce styrene monomer:

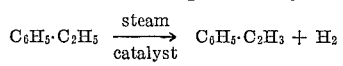

Polystyrene is formed by polymerization of the styrene monomer:

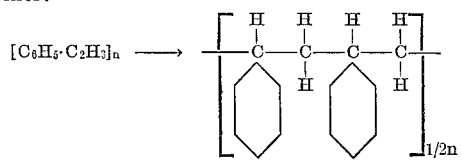

The reaction between an acid and an alcohol produces an ester and water. By using difunctional alcohols and acids, esterification reactions may take place at each reactive site to form linear polymers (polyesters) such as:

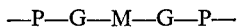

where G=glycol, M=maleic anhydride (or other unsaturated dicarboxylic acid or anhydride) and P=phthalic (or other unsaturated dicarboxylic) acid moieties. This would be classed as an unsaturated polyester because it contains unsaturation in the maleic anhydride moieties. Normally, such unsaturation will not tend to react by itself.

If, however, it is combined with an unsaturated monomeric material, it can be made to react and result in cross-linking which may then be represented as follows:

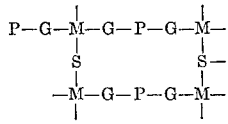

where S represents a styrene moiety or the moiety from other unsaturated cross-linking monomers.

Polyester resins are classified as saturated or unsaturated depending upon the presence or absence of reactive double bonds in the linear polymer. For a detailed description of suitable unsaturated polyesters, and unsaturated cross-linking monomers reference may be made to Bjorksten, Johan, Polyesters And Their Applications, Reinhold Publishing Corp., 1956, particularly chapters 1-3, incorporated herein by reference.

It is a well known fact that unstable chemical molecules such as organic peroxides can function as catalysts for polymerization by undergoing cleavage of the peroxidic linkage to form highly active free radicals which then initiate the polymerization as shown below:

(1) $\qquad R\cdot + M \rightarrow RM\cdot$ (2) $\qquad RM\cdot + nM \rightarrow P$ where R· represents an initiator radical, M the monomer and P the polymer.

While the rate of decomposition to free radicals and the resulting polymerization can be controlled by the type of peroxide and the temperature used, the number of free radicals available to initiate polymerization can be directly influenced by the addition of activators or inhibitors. Activators function by speeding up the decomposition of the peroxide catalyst into free radicals at temperatures below those required to release free radicals if the peroxides is used alone. Activators activate the initiator, in this case the catalyst.

The preferred catalyst-activator combination that proved successful in causing resin gelation at low temperatures is benzoyl peroxide and dimethyl aniline. Benzoyl peroxide was chosen because it is quite inexpensive and because it is readily decomposed into free radicals by dimethyl aniline. Other peroxide catalysts such as p-chlorobenzoyl peroxide, lauroyl peroxide and acetyl peroxide could also be used. Other activators that could also be used include diethyl aniline, N,N-dimethyl p-toluidine or other fluid activators that are volatile at or about room temperature. Solid metallic soap activators, such as cobalt naphthenate, are not useful because their use would require high temperatures harmful to the wood and they tend to char or decompose before significant vaporization.

To reduce drainage and evaporation loss and thus eliminate the need to remove surface layers of materials, the resin is polymerized within the wood by means of a catalyst activator combination which must be able to promote resin curing at about room temperature. The activator is impregnated into the wood before the addition of the resin. To avoid the substantially more expensive process of impregnating the wood with a dilute solution of the activator and baking to remove the solvent, the wood is impregnated with the vapor phase of the activator. This eliminates time consuming and expensive double processing. Although wood appears solid it is porous to varying degrees and the activator vapor can impregnate the interstices of the wood more effectively in a much shorter time than can the liquid activator solution. Vapor impregnation can be accomplished by adding a small jar of the liquid volatile activator to the tank, evacuating the tank to about 1 millimeter of pressure, and then returning it to atmospheric pressure to impregnate the wood. A moderate amount of heat could be applied to the liquid activator at this point to further promote vaporization but this was found unnecessary in the experiments. The liquid activator is then removed and the tank is reevacuated and floorded with the benzoyl peroxide catalyzed resin. The tank is again opened to the atmosphere to impregnate the wood with the resin. As the vacuum is released, atmospheric pressure forces the resin into the wood cavities. The impregnated wood is immersed in the resin for sufficient time to allow substantial polymerization to occur within the wood. After substantial polymerization has occurred and the resin has gelled, the wood pieces can be further polymerized or post-cured by heating in a press or oven. Although a composition containing only a monomer such as styrene should theoretically work with the use of sufficient catalyst, polymerization time is reduced substantially by the addition to the monomer of a small amount (5 to 20 weight percent, although up to 50 weight percent can be used) of an unsaturated polyester. Addition of polyester in excess of about 20% also eliminates the need for any post-cure in a press or oven although heating after gelation of the synthetic resin is desirable to effect a faster cure. Such heating after gelation of the synthetic resin causes minimal evaporation from the surface of the wood since the resin is no longer a liquid.

As a specific example of a preferred embodiment of this invention, plywood pieces 3 x 5 x ¼ inch with a birch veneer surface on one side were treated. They had been given no pre-drying or other conditioning. One piece was placed in a glass resin flask along with 10 grams of liquid dimethyl aniline activator in an aluminum cup. One millimeter vacuum was maintained for 30 minutes followed by atmospheric pressure for one hour. The cup of dimethyl aniline was removed and vacuum was reapplied. This removes air from the pore spaces of the wood and eliminates most of the oxygen, which has an inhibitory effect, from the wood. When about one millimeter of pressure was obtained, the following resin was introduced into the flask:

|  | Parts by weight |
|---|---|
| Styrene (liquid monomer having 50 parts per million tertiary butyl catechol inhibitor) | 85 |
| Castor oil maleate—an unsaturated polyester reaction product of 100 parts castor oil (about 80% glyceride recinoleic acid and 20% glyceride of oleic and other fatty acids) and 30 parts maleic anhydride | 15 |
| Benzoyl peroxide | 2 |

When the birch veneer plywood was immersed in the resin, atmospheric pressure was applied for one hour. Room temperature was maintained throughout. The piece was removed from the resin, placed between polyethylene terephthalate sheets and press plates. The assembly was placed in a press for one hour at 135° C. and at 50 p.s.i., after which it was cooled in the press. The pretreated sample was lightly sanded with steel wool to remove a few patches of styrene film and appeared very tough and lustrous.

The experiment was repeated with a second piece of plywood except that the pretreatment with dimethyl aniline was omitted. The results show:

|  | Percent gain in weight |
|---|---|
| No pretreatment | 15.7 |
| Pretreatment with dimethyl aniline | 32.0 |

Since improvement in the wood is in proportion to the amount of synthetic resin used up to full loading, the results show the vast improvement of vapor phase activator impregnation.

The longer the soaking time at atmospheric pressure the higher the percent gain in weight until gelation occurs. Also, the use of pressure would increase the percent gain in weight of the wood. Some woods such as basswood and cottonwood could probably be impregnated to a much higher loading while woods such as teak or walnut would have lower resin loadings.

In conclusion, this process which uses a combination of catalyst activator can polymerize low cost monomers in wood. The pre-impregnation of the wood with activator in the gaseous phase not only substantially reduces cost and separates the activator from the catalyzed resin thereby eliminating premature polymerization prior to impregnation, but also counteracts any natural inhibitors found in the wood. The use of room temperature throughout the majority of the polymerization period (the activator eliminating the need for heat to start polymerization) prevents the loss of resin from the surface pores of the wood by evaporation and helps to control premature polymerization prior to impregnation. Thus adequate synthetic resin is impregnated at the wood surface giving a uniform wood resin ratio at the surface as throughout the body of the wood and so no significant removal of surface wood is necessary.

While there have been shown and described what are at present considered to be the preferred embodiments of this invention, modifications thereto will readily occur to those skilled in the art. It is not desired therefore that the invention be limited to the specific compounds, embodiments and methods shown and described and it is intended to cover in the appended claims all such modifications as fall within the true spirit and scope of the invention.

I claim:
1. A method of making a synthetic resin-impregnated wood member by polymerizing synthetic resin within the wood, comprising the steps:
   (1) impregnating the wood member with a volatile activator in the vapor phase selected from the group consisting of dimethyl aniline, diethyl aniline and N,N-dimethyl p-toluidine, and
   (2) vacuum impregnating the wood, with a peroxide catalyzed liquid resinous composition containing an unsaturated polymerizable monomer selected from the group consisting of acrylic and vinyl monomers so that the activator causes the catalyst to polymerize the resin within the wood at about room temperature.
2. The method of claim 1 wherein the peroxide catalyst is selected from the group consisting of benzoyl peroxide, p-chlorobenzoyl peroxide, lauroyl peroxide and acetyl peroxide.
3. The method of claim 1 wherein the monomer is selected from the group consisting of vinyl benzene (styrene), vinyl toluene, vinyl acetate and methyl methacrylate.
4. The method of claim 1 wherein the resin also contains about 5–50% of an unsaturated reactive polyester.
5. The method of claim 2 wherein the activator is dimethyl aniline, the catalyst is benzoyl peroxide and the monomer is vinyl benzene (styrene).
6. A wood member thoroughly and homogeneously impregnated with a solid thermoset resin, said resin derived from an admixture containing:
   (a) a monomer selected from the group consisting of vinyl benzene (styrene), vinyl toluene, vinyl acetate and methyl methacrylate,
   (b) a catalyst selected from the group consisting of benzoyl peroxide, p-chlorobenzoyl peroxide, lauroyl peroxide and acetyl peroxide, and
   (c) an activator selected from the group consisting of dimethyl aniline, diethyl aniline and N,N-dimethyl p-toluidine.
7. A method of making a synthetic resin-impregnated wood member by polymerizing synthetic resin within the wood, comprising the steps:
   (1) vacuum impregnating activator vapor selected from the group consisting of dimethyl aniline and N,N-dimethyl p-toluidine within the wood member and then
   (2) vacuum impregnating the wood with a peroxide catalyzed liquid resinous composition containing an unsaturated polymerizable monomer selected from the group consisting of acrylic and vinyl monomers and from 5–50% of an unsaturated reactive polyester, and a peroxide catalyst selected from the group consisting of benzoyl peroxide, lauroyl peroxide, acetyl peroxide and p-chlorobenzoyl peroxide, so that the activator causes the peroxide catalyst to polymerize the resin within the wood at about room temperature.
8. The method of claim 7 wherein the peroxide catalyst is benzoyl peroxide, the monomer is vinyl benzene (styrene) and the activator is dimethyl aniline.
9. The method of claim 8 wherein the activator is impregnated at about room temperature.

References Cited
UNITED STATES PATENTS

| | | | |
|---|---|---|---|
| 2,538,457 | 1/1951 | Hudson | 117—57X |
| 2,740,728 | 4/1956 | Sonnabend | 117—116X |
| 2,978,354 | 4/1961 | Lesser | 117—57X |
| 3,029,159 | 4/1962 | Bliven | 117—148 |
| 3,083,118 | 3/1963 | Bridgeford | 117—57X |
| 3,166,434 | 1/1965 | Gauger | 117—148X |

WILLIAM D. MARTIN, Primary Examiner
W. R. TRENOR, Assistant Examiner

U.S. Cl. X.R.
117—62.2, 148